252-146 AU 157 EX
6/17/86 OR 4,595,519

United States Patent [19]

Takeno et al.

[11] Patent Number: 4,595,519

[45] Date of Patent: Jun. 17, 1986

[54] METAL CLEANING COMPOSITIONS

[75] Inventors: Tadayoshi Takeno; Koichi Ishii, both of Kurashiki; Koichi Yamane; Kazuo Kita, both of Wakayama; Toshio Iwasaki; Koichi Hirase, both of Kurashiki, all of Japan

[73] Assignees: Kao Corporation, Tokyo; Kawasaki Steel Corporation, Kobe, both of Japan

[21] Appl. No.: 632,665

[22] Filed: Jul. 20, 1984

[30] Foreign Application Priority Data

Jul. 22, 1983 [JP] Japan ................................ 58-132793
Jul. 22, 1983 [JP] Japan ................................ 58-132794

[51] Int. Cl.[4] ........................ C03C 23/00; C23G 1/02; C11D 7/22

[52] U.S. Cl. ........................................ 252/146; 134/2; 134/41; 252/142; 252/174.18; 252/150; 252/540; 252/543; 252/534

[58] Field of Search .............. 252/173, 174.18, 174.19, 252/146, 150, 393, 142, 156, 540, 533, 559, 534, DIG. 14, 180, 546; 134/2, 3, 38, 39, 40, 41

[56] References Cited

U.S. PATENT DOCUMENTS 3,337,471 8/1967 Levy et al. .......................... 252/153
3,345,296 10/1967 Lutz ....................................... 252/148
3,574,123 4/1971 Laugle ................................. 252/144
4,284,434 8/1981 Lingmann et al. ...................... 134/3
4,416,792 11/1983 Blackstone .......................... 252/527

FOREIGN PATENT DOCUMENTS 1180219 10/1964 Fed. Rep. of Germany .
2100823 9/1972 Fed. Rep. of Germany .
2260633 9/1975 France .
2296683 7/1976 France .
2049723 12/1980 United Kingdom .

*Primary Examiner*—Lorenzo B. Hayes
*Assistant Examiner*—John F. McNally
*Attorney, Agent, or Firm*—Oblon, Fisher, Spivak, McClelland & Maier

[57] ABSTRACT

A metal cleaning composition is provided comprising: a nonionic active agent and/or an anionic active agent having an HLB value ranging from 3 to 18; and a carboxylic acid or salt thereof represented by the formula, $$R—X—(CH_2)_m—COOM$$

in which X represents N—H, $N(CH_2)_n$—COOM or CH—COOM, R represents a saturated or unsaturated aliphatic hydrocarbon group having from 4 to 18 carbon atoms, phenyl group or tolyl group, and M represents a cation; and a five-membered ring compound having either one nitrogen atom and one sulfur atom, or three nitrogen atoms, and/or a quinoline derivative having a hydroxyl group.

The composition according to the invention is advantageous in washing steel or copper plates without inducing pitting corrosion on the metal surface being contacted therewith.

14 Claims, No Drawings

METAL CLEANING COMPOSITIONS

BACKGROUND OF THE INVENTION

1. Field of The Invention

This invention relates to metal cleaning compositions for metals and more particularly, to metal cleaning compositions for steel plates which are used in the final stand of a tandem mill in order to ensure washing of steel plates without corroding the metal being contacted therewith.

2. Description of The Invention

Metals suffer corrosion when contacted with water. Especially, corrosion becomes considerable when water contacting with metals is acidic in nature or contains dissociated ions such as of sodium chloride, thus steel plate manufacturer incurring a great loss. In case where an alkaline washing solution is used in the washing step of metal, corrosion involved is not so excessive. However, when a neutral washing solution is used, a diversity of dissociated ions contained in the solution will cause a problem of corrosion of a variety of metals constituting the apparatus such as iron, steel, copper, brass and the like.

A number of attempts were made in order to avoid the corrosion. For instance, there were developed and widely used rust or corrosion preventives for copper such as benzotriazole, methylbenzotriazole, ethylbenzotriazole, benzothiazole, 2-mercaptobenzothiazole and the like. Alternatively, hydroxyquinoline and salts thereof were developed as an inhibitor for use in the acid cleaning step of a copper plate-making process. However, these corrosion or rust preventives do not show any satisfactory corrosion preventive effects when used singly or in combination as a cleaning agent for readily corrosive metals. This is because the known rust preventives are usually deposited on the metal surface in the form of a film but the film has inevitably defects therein, so that anodes are locally formed and thus corrosion is accelerated on the contrary. In some case, pitting corrosion may take place. Moreover, when applied as metal cleaning agents, rust preventives not only should develop the rust preventing effect, but also should not lower the cleaning effect, not cause oil stain and oil-burnt stain, and not adversely affect the annealing step without involving environmental pollution.

SUMMARY OF THE INVENTION

The present inventors made intensive studies to solve the above problems and, as a result, found that the above purpose can be achieved by use of a specific type of carboxylic acid or salt thereof in combination with at least one surface active agent and a rust preservative.

According to the present invention, there is provided a metal cleaning composition comprising: a nonionic active agent and/or an anionic active agent having an HLB value ranging from 3 to 18; and a carboxylic acid or salt thereof represented by the following general formula $$R—X—(CH_2)_m—COOM$$

in which X represents N—H, $N(CH_2)_n$—COOM or CH—COOM, R represents a saturated or unsaturated aliphatic hydrocarbon group having from 4 to 18 carbon atoms, phenyl group or tolyl group, m and n are independently an integer from 1 to 3, and M represents a cation; and a five-membered ring compound having either one nitrogen atom and one sulfur atom, or three nitrogen atoms, and/or a quinoline derivative having a hydroxyl group.

DETAILED DESCRIPTION OF THE INVENTION AND PREFERRED EMBODIMENTS

The metal cleaning composition of the invention is effective in washing away oils deposited on steel plate without causing oil stain or oxidized oil stain. Also, the composition does not adversely affect the annealing procedure or bring about corrosion or pitting corrosion. The reason why the composition of the invention has such good effects as mentioned above is not known clearly. Presumably, however, this is because corrosion is drastically controlled by the synergistic action of a specific type of carboxylic acid or salt thereof and a rust preventive. More particularly, the rust preventive used is uniformly spread over the metal surface being treated along with the carboxylic acid or salt thereof, thereby covering the metal surface with a thin film of the mixture of the rust preventive and the carboxylic acid or salt thereof. No metal surface is thus exposed. Accordingly, there will not be experienced any problems such as local formation of anodes due to the presence of imperfect portions or defects of the film, and occurrence of pitting corrosion in an aqueous solution in which dissociated ions are present.

The carboxylic acids or salts thereof used in the practice of the invention are those compounds represented by the general formula indicated before. The cation, M, which is used to constitute carboxylates preferably includes an ion of an alkali metal, an aliphatic amine having from 1 to 4 carbon atoms, ammonia, or an alkanolamine having from 2 to 10 carbon atoms. Specific examples of the cation include methylamine, ethylamine, propylamine, butylamine, ethyleneamine, diethylenetriamine, ammonia, monoethanolamine, diethanolamine, triethanolamine, potassium, sodium and the like. Moreover, aminoalcohol 2A, aminoalcohol 2M, aminoalcohol 2P, aminoalcohol EA, aminoalcohol MDA and the like which are available from Nippon Emulsifier Co., Ltd. may be also used.

Specific examples of the aliphatic hydrocarbon groups in the carboxylic acids of the general formula include linear or branched groups such as butyl, amyl, hexyl, octyl, decyl, lauryl, palmityl, myristyl, stearyl, oleyl and the like. Typical examples of the carboxylates are indicated below.

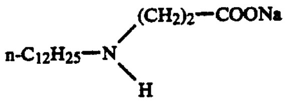

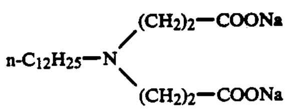

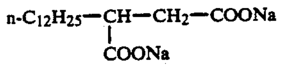

The amount of the carboxylic acid or salt thereof used in the present invention is from 1 to 50 wt % of the total metal cleaning composition. Preferably, the amount is from 1 to 50 times by volume as large as the total amount of a five-membered ring compound and a quinoline derivative having a hydroxyl group.

The five-membered ring compound having one nitrogen atoms and one sulfur atom, or three nitrogen atoms are compounds having a thiazole or triazole ring. Typical examples include benzotriazole, methylbenzotriazole, ethylbenzotriazole, benzothiazole, 2-mercaptobenzothiazole and the like. The compound is used in an amount ranging from 0.01 to 5 wt %, preferably 0.05 to 2 wt %, of the composition.

The quinoline derivatives having a hydroxyl group are, for example, hydroxyquinoline, hydroxyquinolinesulfonic acid and salts thereof. The acids used for neutralization include inorganic and organic acids such as sulfuric acid, nitric acid, hydrochloric acid, citric acid, phosphoric acid, acetic acid, oxalic acid, maleic acid, p-toluenesulfonic acid, and the like. The amount of the quinoline derivative is from 0.01 to 5 wt %, preferably 0.05 to 2 wt %, of the metal cleaning composition.

The nonionic active agents used in the metal cleaning agent of the invention may be any agents which have an HLB value of from 3 to 18. Examples of the nonionic active agent include polyoxyethylene alkyl ethers, polyoxyethylene alkylaryl ethers, sorbitan fatty acid esters, polyoxyethylene sorbitan fatty acid ester, polyoxyethylene fatty acid esters, and glycerine fatty acid mono- and diesters. Preferable agents are those which have an HLB value from 3 to 18 and are represented by the following general formula $$R—O—(CH_2CH_2O)_nH$$

in which R stands for a saturated or unsaturated aliphatic hydrocarbon group having from 6 to 18 carbon atoms or an aromatic group with a hydrocarbon substituent having from 1 to 12 carbon atoms, and n is an integer from 1 to 50, preferably from 3 to 30 carbon atoms. Specific examples of the preferable agents include polyoxyethylene hexyl ether, polyoxyethylene octyl ether, polyoxyethylene decyl ether, polyoxyethylene lauryl ether, polyoxyethylene palmyl ether, polyoxyethylene myristyl ether, polyoxyethylene stearyl ether, polyoxyethylene oleyl ether, polyoxyethylene tolyl ether, polyoxyethylene xylenyl ether, polyoxyethylene octylphenyl ether, polyoxyethylene nonylphenyl ether, polyoxyethylene decylphenyl ether, polyoxyethylene dodecylphenyl ether, and the like. The number of moles of added oxyethylene in these compounds is suitably determined depending on the HLB value which is defined within a range of from 3 to 18. For instance, with polyoxyethylene lauryl ether, if the number of the moles is 50, the resulting ether has an HLB value of 18.5 and is thus excluded from the scope of the invention. The nonionic active agent is used in an amount ranging from 1 to 40 wt %, preferably from 3 to 30 wt %, of the total composition.

The anionic active agents used in the present invention are alkylarylsulfonates, alkanesulfonates, alkenesulfonates, sulfosuccinates, α-sulfofatty acid esters, salts of fatty acids, alkylsulfates, α-olefinsulfonates, polyoxyethylene alkyl ether sulfates, polyoxyethylene alkylarylsulfate, and the like. Preferable agents are those represented by the following formulas $$R_1—SO_3X \quad (1)$$

-continued (2)

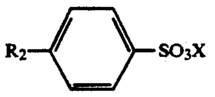

$$R_1—O—SO_3X \quad (3)$$

$$R_1—COOX \quad (4)$$

in which each $R_1$ represents a saturated or unsaturated aliphatic hydrocarbon group having from 6 to 22 carbon atoms, $R_2$ represents a saturated or unsaturated aliphatic hydrocarbon group having from 6 to 18 carbon atoms, and each X represents a cation.

Examples of the aliphatic hydrocarbon groups represented by $R_1$ in the formulas include hexyl, octyl, decyl, lauryl, myristyl, palmityl, stearyl, oleyl, linoleyl and the like. Likewise, examples of the aliphatic hydrocarbon groups represented by $R_2$ include hexyl, octyl, decyl, lauryl, myristyl, palmityl, stearyl and the like. The amount of the anionic active agent is preferably in the range of from 1 to 40 wt %, more preferably from 3 to 30 wt %, of the metal cleaning composition.

When an etchant capable of developing the etching effect on steel plates under neutral conditions is added, the metal cleaning composition of the invention can exhibit good cleability and does not cause any chemical damages. The etchants useful in the present invention are indicated below.

(1) Sulfonic acids and sulfonates

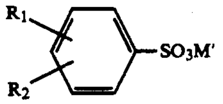

in which $R_1$ and $R_2$ are independently represent hydrogen, methyl or ethyl, and M' represents a cation;

(2) carboxylic acids or carboxylates (a) acetic acid or derivatives thereof

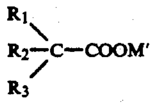

in which $R_1$, $R_2$ and $R_3$ independently represent hydrogen, halogen, alkyl group having from 1 to 3 carbon atoms, aryl group, and M' has the same meaning as defined above, (b) oxalic acid and formic acid, (c) α,β-unsaturated dicarboxylic acids and derivatives thereof

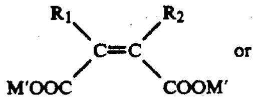

or

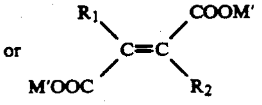

in which each $R_1$ and each $R_2$ independently represent hydrogen, halogen, alkyl group having from 1 to 4 carbon atoms, or aryl group, and M' has the same meaning as defined above, (d) aromatic dicarboxylic acids and derivatives thereof

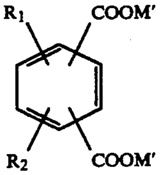

in which $R_1$ and $R_2$ independently represent hydrogen, halogen, alkyl group having from 1 to 4 carbon atoms, or aryl group, and M' has the same meaning as defined before, and (e) aromatic tricarboxylic acids or derivatives thereof

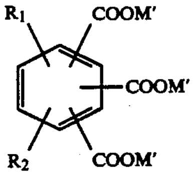

in which $R_1$ and $R_2$ independently represent hydrogen, halogen, alkyl group having from 1 to 4 carbon atoms, or aryl group, and M' has the same meaning as defined before; and (3) inorganic acids selected from nitric acid, sulfuric acid and phosphoric acid.

Specific examples of the sulfonic acids used as the etchant are preferably benzenesulfonic acid, toluenesulfonic acid, xylenesulfonic acid, ethylbenzenesulfonic acid and the like. Examples of the carboxylic acids include acetic acid, mono-, di- and trichloroacetic acid, mono-, di- and tribromoacetic acid, mono-, di- and trifluoroacetic acid, propionic acid, butyric acid, isobutyric acid, oxalic acid, formic acid, maleic acid, fumaric acid, phthalic acid, isophthalic acid, terephthalic acid, trimellitic acid, and the like. Examples of phosphoric acid include phosphoric acid, phosphorous acid, hexametaphosphoric acid, polyphosphoric acid, and the like.

Where the etchant is added to the metral cleaning composition of the invention, it is preferred to adjust the pH of the composition to 5.0 to 8.0. pH values lower than 5.0 are unfavorable because steel plates will be corroded due to the excessively high etching capability with the life of the etchant becoming short. Higher pH values lead to a considerable lowering of etching ability though a degree of corrosion involved in steel plate is reduced, resulting in a considerable lowering of cleaning ability.

In order to neutralize sulfonic acids, carboxylic acids or inorganic acids used as the etchant and adjust the pH of the metal cleaning agent within the above-defined range, there are used aliphatic amines having from 1 to 4 carbon atoms, ammonia, alkali metals, hydrazine, hydroxylamine, and compounds having such ions as indicated above. Specific examples include methylamine, ethylamine, propylamine, butylamine, ethylenediamine, ethylenetriamine, ammonia, mono-, di- and triethanolamine, N-butylethanolamine, lithium hydroxide, potassium hydroxide, sodium hydroxide, and the like. However, alkali metal salts of inorganic acids should be omitted.

The etchant is used in an amount of from 0.01 to 40 wt %, preferably from 0.1 to 30 wt %, of the metal cleaning composition.

For the preparation of the metal cleaning composition of the invention, there may be added, aside from the above-described ingredients, ordinarily used builders for cleaning aid or cleaning life prolongation such as, for example, organic or inorganic chelating agents, silicates, Glauber's salt and the like, preservatives for keeping the composition from decay, defoamers for the metal cleaning composition or other solutions used therefor, solubilizers for stabilizing the metal cleaning composition, and the like.

The present invention is described in more detail by way of examples, which should not be construed as limiting the present invention thereto.

EXAMPLE 1

Metal cleaning compositions of the invention were prepared to test the corrosion preventive efficiency thereof. The results are shown in Table 2.

[Chemicals Used in Example and Preparation Thereof]

(1) Cleaning Fluid

Twenty percent of an adduct of 9 moles of dodecyl alcohol ethylene oxide, 20% of sodium dodecyl sulfate, 20% of triethanolamine p-toluenesulfonate, and 40% of water were mixed and then diluted with water in an amount of 100 times as great as an amount of the mixture.

(2) Corrosion Preventive Agent

Different types of compound (A), compound (B) and compound (C) were mixed in different amounts indicated in Table 1, to which was added 2% of an adduct of 9 moles of dodecyl alcohol ethylene oxide as a solubilizer with the balance of water. The corrosion preventive agents used are indicated below.

Compound (A)

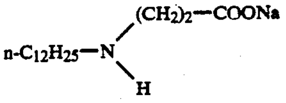
(i)

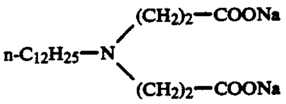
(ii)

Compound (B)

Methylbenzotriazole (iii)
2-Mercaptobenzothiazole (iv)

Compound (C)

p-Toluenesulfonate of 8-oxyquinoline (v)
Sulfate of 8-oxyquinoline-5-sulfonic acid (vi)

TABLE 1

| Group of Compound | Compound | Agent No. | | | | | | | | | | | | | | | | | | | | | | |
|---|---|---|---|---|---|---|---|---|---|---|---|---|---|---|---|---|---|---|---|---|---|---|---|---|
| | | Composition of Invention | | | | | | | | | | | | | | | | | | | | Comparative Composition | | |
| | | 1 | 2 | 3 | 4 | 5 | 6 | 7 | 8 | 9 | 10 | 11 | 12 | 13 | 14 | 15 | 16 | 17 | 18 | 19 | 20 | 21 | 1 | 2 | 3 |
| | | Corrosion Preventive Composition (%) | | | | | | | | | | | | | | | | | | | | | | | |

TABLE 1-continued

| Group of Compound | Compound | Agent No. Composition of Invention 1 | 2 | 3 | 4 | 5 | 6 | 7 | 8 | 9 | 10 | 11 | 12 | 13 | 14 | 15 | 16 | 17 | 18 | 19 | 20 | 21 | Comparative Composition 1 | 2 | 3 |
|---|---|---|---|---|---|---|---|---|---|---|---|---|---|---|---|---|---|---|---|---|---|---|---|---|---|
| A | i | 5 | 5 | 5 | 5 | | | 5 | 5 | 5 | 5 | | | | | | | | | | | 5 | | | |
| | ii | | | | | 5 | 5 | | | | | 5 | 5 | 5 | 5 | | | | | | | | | | 5 |
| B | iii | 0.2 | | | | | | 0.2 | 0.2 | | | 0.2 | 0.2 | | | | | | | 0.2 | | | | | |
| | iv | | 0.2 | | | | | | | 0.2 | 0.2 | | | 0.2 | 0.2 | | | | | | 0.2 | | | | |
| C | v | | | 0.2 | | 0.2 | | 0.2 | | 0.2 | | 0.2 | | 0.2 | | 0.2 | 0.4 | | | | | | | | |
| | vi | | | | 0.2 | | 0.2 | | 0.2 | | 0.2 | | 0.2 | | 0.2 | | | 0.2 | 0.4 | | | | | | |

(3) Cleaning Composition

One percent of each corrosion preventive agent was added to the cleaning fluid to prepare a solution of the cleaning composition.

[Corrosion Preventive Test]

(1) Metal pieces being tested were a commercially available copper piece and a steel piece of SPCC-B, each with a size of 60×80×0.5 mm.

(2) The solution of the cleaning composition was prepared in a one liter breaker, in which each test piece was suspended and dipped. The solution was agitated by means of a propeller agitator at 400 r.p.m. and kept at a temperature of 55° C. for 5 hours. The corrosion preventive efficiency was evaluated by measuring a weight loss after the immersion. The weight of each test piece after the immersion should be measured after removal of a produced film with a solvent because the weight of the film gives a significant influence on the weight of the test piece.

[Results]

TABLE 2

| Corrosion Preventive Agent No. | | Present Invention 1 | 2 | 3 | 4 | 5 | 6 | 7 | 8 | 9 | 10 | 11 | 12 | 13 | 14 | 15 | 16 | 17 | 18 | 19 | 20 | 21 | Comparative 1 | 2 | 3 |
|---|---|---|---|---|---|---|---|---|---|---|---|---|---|---|---|---|---|---|---|---|---|---|---|---|---|
| Weight Loss by Corrosion ($g/m^2$) | Copper | 1 | 1 | 5 | 5 | 5 | 5 | 1 | 1 | 1 | 1 | 1 | 1 | 1 | 1 | 5 | 4 | 5 | 4 | 2 | 2 | 8 | 10 | 5 | 8 |
| | Steel | 5 | 5 | 1 | 1 | 1 | 1 | 1 | 1 | 1 | 1 | 1 | 1 | 1 | 1 | 2 | 2 | 2 | 2 | 5 | 5 | 8 | 10 | 5 | 8 |
| | | 0 | 0 | 0 | 0 | 0 | 0 | 0 | 0 | 0 | 0 | 0 | 0 | 0 | 0 | * | * | * | * | * | * | 0 | | | |

(Note)
Presence of pitting corrosion *
Absence of pitting corrosion 0
Comparative Example 1: cleaning solution alone
Comparative Example 2: water alone (ph 7.0)
In the corrosion preventive composition, the balance ingredient is water.

Upon comparison between the results of Comparative Examples 1 and 2, it will be seen that the neutral cleaning agent acts to more violently corrode the copper and steel than neutral water. This is considered due to the influence of the dissociated salt forming local cells.

When compound (C) is used singly (Nos. 15 to 18), the corrosion weight loss of the copper is reduced to 40 to 50% of the weight loss of Comparative Example 1 using the cleaning agent alone (the corrosion weight loss is hereinafter indicated as a ratio to the case of Comparative Example 1). With compound (B) alone, the reduction is 20% (Nos. 19 and 20). When compounds (A) and (B) are used in combination, the weight loss is reduced to 10% (Nos. 1 and 2), and when compound (A) and (C) are used in combination, it is reduced to 50% (Nos. 3, 4, 5 and 6). In addition, the test copper pieces are all very clean on the surfaces thereof. From the above, it will be understood that the compositions of the invention have remarkable effects.

The corrosion weight loss of the steel piece was reduced to 20% in case of compound (C) alone (Nos. 15 to 18), and 50% in case of Compound (B) alone (Nos. 19 and 20). Thus, the corrosion weight loss is significantly reduced but pitting corrosion is recognized in some instances. In this case, a fresh cleaning fluid is prepared and used to conduct the corrosion preventive test using a once tested piece, with a similar weight loss being obtained. When compounds (A) and (C) are used in combination, the weight loss is reduced to 10% (Nos. 3 to 6). To a surprise, no pitting corrosion is found on the steel pieces. In this case, when the corrosion preventive test is continued, the corrosion weight loss per unit time becomes smaller as a function of time. This is considered as follows: compound (A) enables compound (B) and/or (C) to be uniformly spread over the metal surface and to assist formation of an adsorption film which is very small in the number of defects.

Combinations of compounds (A), (B) and (C) are shown in Nos. 7 to 14. The corrosion weight losses of the copper and steel pieces are both 10%, and no pitting corrosion is found on the steel. Thus, the corrosion preventive compositions of the invention will be found to exhibit a very remarkable corrosion preventive property. The corrosion preventive compositions of the invention have the feature that the cleaning ability of the metal cleaning agent does not deteriorate. It will be noted that when compound (A) alone is used, the corrosion weight loss of each of the copper and steel pieces is 80% of the weight loss in Comparative Example.

EXAMPLE 2

Metal cleaning compositions of the invention were prepared and used to determine their cleaning and corrosion preventive characteristics. The results are shown in Table 3.

[Preparation of Metal Cleaning Compositions]

An adduct of 9 moles of dodecyl ethylene oxide as a nonionic active agent, sodium dodecyl sulfate as an anionic active agent, N-Lauryl-N,N-dipropionic acid as a carboxylic acid, and acetic acid as an etchant were mixed together, to which was further added a corrosion preventive ingredient, followed by neutralizing with monoethanolamine and adjusting the pH to 5 to 8, thereby obtaining a metal cleaning composition. This composition was diluted to 1:100 thereby obtaining a cleaning fluid.

[Test Method]

(Cleaning Test)

(1) Preparation of Test Pieces

Each test piece of a commercially available cold rolling steel plate SPCC (JIS G 3141) with a size of 100×50×0.5 mm was cleansed with n-hexane, dried and weighed to give a weight, $W_0$. Subsequently, the test piece was immersed in a 5% cold rolling oil solution in hexane, dried and weighed to give a weight, $W_1$. The cold rolling oil used was a mill clean rolling oil which was mixture of a mineral oil and an ester.

(2) (Test Method for Cleanability)

Into one liter beaker was charged a cleaning fluid (diluted to 1:100), followed by agitating using a propeller agitator at a revolutional frequency of 400 r.p.m. and keeping at a temperature of 55° C. A test piece which had been previously heated to 100° C. was immersed in the cleaning fluid for 5 seconds and quickly dried in a stream of air with a pressure of 3 kg/cm². After the drying, the test piece was weighed as $W_2$.

The cleanability was calculated according to the following equation and expressed as an average value of five measurements.

$$\text{Cleaning rate} = \frac{W_1 - W_2}{W_1 - W_0} \times 100$$

(Corrosion Preventive Test)

This test was effected in the same manner as in Example 1.

[Results]

TABLE 3

| | | Product of Invention | | | Comparative Product | | | | | |
|---|---|---|---|---|---|---|---|---|---|---|
| | | 1 | 2 | 3 | 4 | 5 | 6 | 7 | 8 | 9 |
| Cleaning Composition (%) | Etchant | 5 | 5 | 5 | 0 | 0 | 5 | 5 | 5 | 5 |
| | Nonionic Active Agent | 5 | 0 | 5 | 0 | 5 | 5 | 5 | 5 | 5 |
| | Anionic Active Agent | 0 | 5 | 5 | 0 | 5 | 5 | 5 | 5 | 5 |
| | Carboxylic Acid | 5 | 5 | 5 | 5 | 5 | 5 | 5 | 0 | 0 |
| | Compound (B) | 1 | 1 | 1 | 1 | 1 | 0 | 1 | 1 | 0 |
| | Compound (C) | 1 | 1 | 1 | 1 | 1 | 1 | 0 | 1 | 0 |
| Cleaning Rate (%) | | 80 | 75 | 90 | 5 | 20 | 90 | 90 | 90 | 90 |
| Weight Loss by Corrosion (g/m²) | Copper | 1 | 1 | 1 | 1 | 1 | 5 | 1 | 2 | 10 |
| | Steel | 1 | 1 | 1 | 1 | 1 | 1 | 5 | 2 | 10 |
| Pitting Corrosion | | 0 | 0 | 0 | 0 | 0 | 0 | 0 | * | * |

(Note)
Pitting corrosion: Yes *, No 0
Cleaning composition: the balance is water.

As will be clear from the above results, the cleaning rate was 5% (No. 4) when the corrosive preventive ingredient alone is used, 20% (No. 5) in the absence of any etchant, and as high as 75 to 90% (Nos. 1 to 3) when the etchant and the nonionic active agent and/or anionic active agent are used in combination.

On the other hand, when cleaning ingredients alone are used, the cleaning rate is as high as 90% but steel and copper are highly corroded. With the corrosion preventive ingredients alone, a good corrosion preventive effect is attained but the cleaning rate is low (No. 4). When the cleaning and corrosion preventive ingredients are used in combination, the cleaning rate is high with good corrosion preventive effect (Nos. 1 to 3).

What is claimed is:

1. A metal cleaning composition comprising:

(A) a nonionic surface active agent or an anionic surface active agent having an HLB value ranging from 3 to 18, wherein said agent is contained in an amount of from 1 to 40 weight percent of the composition, (B) a carboxylic acid or salt thereof represented by the following general formula $$R-X'-(CH_2)_m-COOM$$

in which X represents >N—H, >N$(CH_2)_n$—COOM or >CH—COOM, R represents a saturated or unsaturated aliphatic hydrocarbon group having from 4 to 18 carbon atoms, phenyl group or tolyl group; m and n are independently an integer from 1 to 3, and M represents a cation, wherein said carboxylic acid or a salt thereof is contained in an amount of from 1 to 50 weight percent of the composition, and (C) a five-membered ring compound having either one nitrogen atom and one sulfur atom, or three nitrogen atoms, or a quinoline derivative having a hydroxyl group, wherein said five-membered ring compound or quinoline derivative is contained in an amount of from 0.05 to 2 weight percent of the composition, wherein said composition is formulated to be soluble in aqueous solution.

2. The metal cleaning composition according to claim 1, wherein said five-membered ring compound is one or more members selected from the group consisting of benzotriazole, methylbenzotriazole, ethylbenzotriazole, benzothiazole, and 2-mercaptobenzothiazole.

3. The metal cleaning composition according to claim 2 or 1, further comprising one or more etchant selected from the group consisting of (1) sulfonates, (2) carboxylic acids or salts thereof, and (3) salts of inorganic acids indicated below (1) sulfonic acids and sulfonates

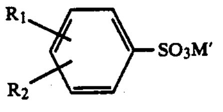

in which $R_1$ and $R_2$ are independently hydrogen, methyl group or ethyl group, and M' represents a cation;

(2) carboxylic acids or salts thereof (a) acetic acid or derivatives thereof

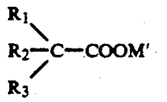

in which $R_1$, $R_2$ and $R_3$ independently represent hydrogen, halogen, alkyl group having from 1 to 3 carbon atoms, aryl group, and M' has the same meaning as defined above, (b) oxalic acid and formic acid, (c) $\alpha,\beta$-unsaturated dicarboxylic acids and derivatives thereof

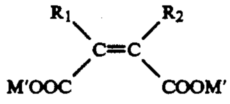

or

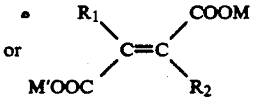

in which each $R_1$ and each $R_2$ independently represent hydrogen, halogen, alkyl group having from 1 to 4 carbon atoms, or aryl group, and M' has the same meaning as defined above, (d) aromatic dicarboxylic acids and derivatives thereof

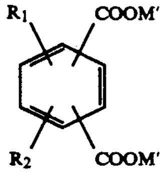

in which $R_1$ and $R_2$ independently represent hydrogen, halogen, alkyl group having from 1 to 4 carbon atoms, or aryl group, and M' has the same meaning as defined before, and (e) aromatic tricarboxylic acids or derivatives thereof in which $R_1$ and $R_2$ independently represent hydrogen, halogen, alkyl group having from 1 to 4 carbon atoms, or aryl group, and M' has the same meaning as defined before; and (3) inorganic acids selected from nitric acid, sulfuric acid and phosphoric acid.

4. The metal cleaning composition according to claim 3, wherein the cation, M', of each salt in claim 3 is an ion of at least one compound selected from the group consisting of an aliphatic amine having from 1 to 4 carbon atoms, ammonia, an alkanolamine having from 2 to 10 carbon atoms, an alkali metal, hydrazine, and hydroxylamine.

5. The cleaning composition of claim 1 which is diluted about 100-fold with water to yield a cleaning fluid.

6. The composition of claim 1, wherein said cation M is selected from the group consisting of cations of methylamine, ethylamine, propylamine, butylamine, ethyleneamine, diethylenetriamine, ammonia, monoethanolamine, diethanolamine, triethanolamine, potassium and sodium.

7. The composition of claim 1, wherein said group R is selected from the group consisting of butyl, amyl, hexyl, octyl, decyl, lauryl, palmityl, myristyl, stearyl and oleyl.

8. The composition of claim 1, wherein said carboxylic acid salt is

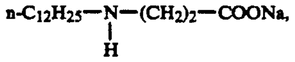

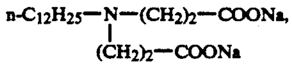

or

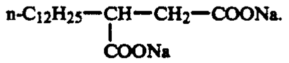

9. The composition of claim 1, wherein said quinoline compound is selected from the group consisting of hydroxyquinoline, hydroxyquinoline-sulfonic acid, and salts thereof.

10. The composition of claim 1, wherein said surface active agent is represented by the formula:

$$R—O—(CH_2CH_2O)_nH$$

wherein R stands for a saturated or unsaturated aliphatic hydrocarbon group having from 6 to 18 carbon atoms or an aromatic group with a substituent having from 1 to 12 carbon atoms and n is an integer from 1 to 50.

11. The composition of claim 1, wherein said anionic surface active agent is selected from the group consisting of alkylarylsulfonates, alkanesulfonates, alkenesulfonates, sulfosuccinates, $\alpha$-sulfofatty acid esters, salts or fatty acids, alkylsulfates, $\alpha$-olefinsulfonates, polyoxyethylene alkyl ether sulfates, and polyoxyethylene alkylarylsulfate.

12. The composition of claim 3, wherein said sulfonic acid used as the etchant is benzenesulfonic acid, toluenesulfonic acid, xylenesulfonic acid or ethylbenezenesulfonic acid.

13. The composition of claim 3, wherein the pH of said composition is 5.0 to 8.0.

14. The composition of claim 3, wherein said etchant is included in an amount of from 0.01 to 40% by weight of the composition.

* * * * *